US 6,370,709 B1

(12) United States Patent
Stradinger et al.

(10) Patent No.: US 6,370,709 B1
(45) Date of Patent: Apr. 16, 2002

(54) DISCHARGE VALVE HAVING A DISK WITH A FLUSHING APERTURE AND AN AIR INTAKE APERTURE FOR A VACUUM TOILET

(75) Inventors: Jay D. Stradinger, Roscoe; William Bruce Anderson, Rockford; Mark A. Pondelick; Douglas M. Wallace, both of Roscoe; Michael B. Hancock, Rockford, all of IL (US); Arthur J. McGowan, Jr., Thornton, CO (US); Ian Tinkler, Rockford, IL (US)

(73) Assignee: Evac International Oy, Helsinki (FI)

( * ) Notice: Subject to any disclaimer, the term of this patent is extended or adjusted under 35 U.S.C. 154(b) by 0 days.

(21) Appl. No.: 09/713,967

(22) Filed: Nov. 16, 2000

(51) Int. Cl.$^7$ ................................................ E03D 11/10
(52) U.S. Cl. ................... 4/434; 4/431; 4/435; 137/588; 137/595
(58) Field of Search ............................ 4/300, 316, 420, 4/431–435, 458; 137/588, 595, 553, 554, 192, 205, 625.31, 625.32, 614.2; 251/16, 25

(56) References Cited

U.S. PATENT DOCUMENTS

| | | | |
|---|---|---|---|
| 3,239,849 A | 3/1966 | Liljendahl | 4/77 |
| 3,860,973 A * | 1/1975 | Uyeda et al. | 4/431 |
| 3,922,730 A | 12/1975 | Kemper | 4/10 |
| 3,995,328 A | 12/1976 | Carolan et al. | 4/10 |
| 4,063,315 A | 12/1977 | Carolan et al. | 4/10 |
| 4,184,506 A | 1/1980 | Varis et al. | 137/205 |
| 4,246,925 A | 1/1981 | Oldfelt | 137/205 |
| 4,275,470 A | 6/1981 | Badger et al. | 4/316 |
| 4,357,719 A | 11/1982 | Badger et al. | 4/316 |
| 4,438,781 A * | 3/1984 | Brenholt | 137/553 |
| 4,521,925 A | 6/1985 | Chen et al. | 4/362 |
| 4,713,847 A | 12/1987 | Oldfelt et al. | 4/316 |
| 5,007,117 A | 4/1991 | Oldfelt et al. | 4/432 |
| 5,099,867 A * | 3/1992 | Emery | 137/554 |
| 5,133,853 A | 7/1992 | Mattsson et al. | 210/104 |
| 5,271,105 A * | 12/1993 | Tyler | 4/431 |
| 5,604,938 A | 2/1997 | Tyler | 4/321 |
| 5,732,417 A | 3/1998 | Pondelick | 4/427 |
| 6,131,596 A | 10/2000 | Monson | 137/14 |
| 6,152,160 A | 11/2000 | Bowden Wilcox et al. | 137/15.01 |
| 6,186,162 B1 * | 2/2001 | Purvis et al. | 137/554 |
| 6,216,285 B1 | 4/2001 | Olin | 4/431 |

* cited by examiner

Primary Examiner—Gregory L. Huson
Assistant Examiner—Tuan Nguyen
(74) Attorney, Agent, or Firm—Marshall, Gerstein & Borun

(57) ABSTRACT

A discharge valve is disclosed for use in a vacuum toilet system having a waste receptacle defining an outlet and a sewer line placeable under partial vacuum. The discharge valve comprises a housing defining an inlet and an outlet and a rotatable discharge valve member disposed in the housing for selectively establishing fluid communication between the inlet and the outlet. A periphery of the disk valve member being formed with a series of ear teeth. An actuator is provided having a rotatable spur gear adapted to engage the periphery of the discharge valve member.

27 Claims, 6 Drawing Sheets

DISCHARGE VALVE HAVING A DISK WITH A FLUSHING APERTURE AND AN AIR INTAKE APERTURE FOR A VACUUM TOILET

FIELD OF THE INVENTION

The present invention generally relates to toilets and, more particularly, to vacuum toilet Systems.

BACKGROUND OF THE INVENTION

Vacuum toilet systems are generally known in the art for use in both vehicle and stationary applications. A vacuum toilet system typically comprises a bowl for receiving waste having an outlet connected to a vacuum sewer line. A discharge valve is disposed between the bowl outlet and vacuum sewer line to selectively establish fluid communication therebetween. The vacuum sewer line is connected to a collection tank that is placed under partial vacuum pressure by a vacuum source, such as a vacuum blower. When the discharge valve is opened, material in the bowl is transported to the sewer pipe as a result of the pressure difference between the interior of the bowl and the interior of the sewer line. Conventional vacuum toilet systems also include a source of rinse fluid and a rinse fluid valve for controlling introduction of rinse fluid into the bowl.

Conventional discharge valves are overly complicated to assemble. Such valves typically have a movable valve member linked to an actuator that operates the valve member between open and closed positions. The linkage between the valve member and the actuator often includes pivoting arms, joints, and other components which increase the complexity of valve assembly. In addition, gearing is often needed to slow the actuator speed to the desired valve actuation speed. Gear heads having four or more stages are often required to obtain the desired speed. Each stage, however, introduces friction and other losses that decrease the efficiency of power transmission from the actuator to the valve member.

In addition, conventional discharge valves undesirably generate a high noise level during a flush operation. When the discharge valve opens in response to a flush command, a significant amount of air, in addition to waste material and rinse fluid, is pulled into the sewer line. The air flows through a relatively narrow bowl outlet, which creates the noise. The noise may further be amplified by the shape of the toilet bowl. Apparatus is known for reducing the noise by introducing a secondary source of air into the sewer pipe during a flush cycle. This apparatus, however, requires a separate valve and actuator, thereby increasing the cost and complexity of the toilet.

Still further, vacuum toilet systems in general and discharge valves in particular are overly difficult and time consuming to maintain. Maintenance concerns are particularly significant in aircraft applications, in which a number of sub-systems are installed on board. According to general practice in the airline industry, each sub-system includes one or more components which must be replaced in the event of failure, such replacement components being commonly referred to as line replaceable units (LRUs). Presently, the entire vacuum toilet is defined as the LRU for the vacuum toilet system. As a result, an airline must stock one or more replacement toilets in the event of a toilet failure, so that the replacement toilet may be swapped in for the faulty toilet. A "bench test" is then performed on the faulty toilet to determine which components have failed in the toilet. The faulty components are then repaired or replaced (which may include significant disassembly and reassembly of the toilet) so that the repaired toilet may be reused on another aircraft.

Each of the steps performed during a toilet repair is overly difficult and time consuming. To remove an entire toilet assembly from an aircraft requires disassembly of at least four self-locking mounting fasteners, an electrical connection, a grounding strap, a potable water line connection, and a waste discharge pipe connection. Each connection may be difficult to access, and may require a particular tool in order to loosen and disconnect. The same connections must then be reconnected for the replacement toilet.

Even if it were possible to remove and replace a single toilet component, it would be overly difficult and time consuming to do so. Removal of a component would require disconnection of several wires and pipes, and the components are often located in areas which are difficult to access. Furthermore, it would be difficult to diagnose whether one component or several components had failed. There exists a multitude of combinations of simultaneous component failures, which may lead to trouble-shooting errors and the replacement or repair of non-faulty components.

Conventional discharge valves also use seals which are difficult to install and replace. As noted above, a discharge valve typically has a moving valve member disposed inside a housing. Seals are typically provided inside the housing to prevent leaks between the valve member and the upstream and downstream sides of the housing. As a result, the valve housing must be disassembled to remove and replace a faulty seal.

Conventional vacuum toilets further fail to provide adequate feedback regarding valve position. Conventional discharge valves are typically driven by an electric motor actuator having mechanical limit switches and signal switches to control valve position. Such a switch is overly complicated to use and maintain. The switches must be precisely set to trigger at the appropriate time, and special tooling is often required to set the switch. In addition, by locating the switches in the actuator, they are subject to mechanical wear and contact erosion, which may alter the setting of the switch, thereby requiring re-setting. Furthermore, lubricant or other materials may migrate to the switches, causing switch failure. Most importantly, the conventional apparatus is unreliable since valve position is inferred from the actuator position. As a result, the conventional approach is not responsive to various failure situations where the actuator may be operable but the valve is not, such as when the linkage connecting the actuator to the valve is broken or defective.

SUMMARY OF THE INVENTION

In accordance with certain aspects of the present invention, a discharge valve is provided for use in a vacuum toilet system having a waste receptacle defining an outlet and a sewer line placeable under partial vacuum. The discharge valve comprises a housing defining an inlet and an outlet, and a rotatable discharge valve member disposed in the housing for selectively establishing fluid communication between the inlet and the outlet, wherein a periphery of the valve member being formed with a series of gear teeth. An actuator has a rotatable gear adapted to engage the periphery of the discharge valve member.

In accordance with additional aspects of the present invention, a discharge valve is provided for use with a vacuum toilet system having a waste receptacle defining an outlet and a sewer line placeable under partial vacuum. The discharge valve comprises a housing defining a flush valve inlet fluidly communicating with the waste receptacle outlet, a flush valve outlet fluidly communicating with the sewer line, an air intake valve inlet fluidly communicating with ambient air, and an air intake valve outlet fluidly communicating with the sewer line. A movable valve member is disposed in the housing and defining first and second apertures, the valve member having a closed position in which the valve member obstructs fluid communication between the flush inlet and flush outlet, and between the air intake valve inlet and air intake valve outlet, and an open position in which the first and second apertures establish fluid communication between the flush inlet and flush outlet, and between the air intake valve inlet and air intake valve outlet.

In accordance with further aspects of the present invention, a discharge valve provided for use with a vacuum toilet system having a waste receptacle defining an outlet and a sewer line placeable under partial vacuum. The discharge valve comprises a housing defining a flush valve inlet fluidly communicating with the waste receptacle outlet and a flush valve outlet fluidly communicating with the sewer line. A rotatable valve member is disposed in the housing and defines a first aperture. The valve member has a closed position in which the valve member obstructs fluid communication between the flush valve inlet and the flush valve outlet, and an open position in which the first aperture establishes fluid communication between the flush valve inlet and flush valve outlet. A first seal is provided having a cylindrical wall sized for insertion from an exterior of the housing into the flush valve inlet, the cylindrical wall having a bottom edge adapted to engage and seal with the rotatable valve member.

In accordance with still further aspects of the present invention, a discharge valve is provided for use in a vacuum toilet system. The discharge valve comprises a housing defining a discharge valve inlet and a discharge valve outlet. A valve member is disposed inside the housing, the valve member being movable between a closed position in which the valve member obstructs fluid communication between the discharge valve inlet and the discharge valve outlet, and an open position in which fluid communication is established between the discharge valve inlet and the discharge valve outlet. A sensor is provided for detecting position of the valve member, the sensor being located outside of the housing.

In accordance with yet additional aspects of the present invention, a discharge valve is provided for use in a vacuum toilet system having a bowl defining an outlet and a sewer line placeable under partial vacuum. The discharge valve comprises a housing defining a discharge valve inlet adapted for fluid communication with the bowl outlet and a discharge valve outlet adapted for fluid communication with the sewer line. A seal is disposed inside the discharge valve outlet, and a disk is disposed inside the housing and has first and second apertures connected by a slot. The first aperture, second aperture, and slot divide the disk into first and second disk halves, and the disk is rotatable between a closed position, in which one of the first and second disk halves engages the seal to obstruct fluid flow, and an open position in which one of the first and second apertures is aligned with the seal to allow fluid flow therethrough. The slot allows the first and second disk halves to deflect in response to partial vacuum at the discharge valve outlet to more reliably engage the disk with the seal in the closed position.

Other features and advantages are inherent, in the apparatus claimed and disclosed or will become apparent to those skilled in the art from the following detailed description and its accompanying drawings.

DETAILED DESCRIPTION OF THE PREFERRED EMBODIMENTS

Figure 1A:
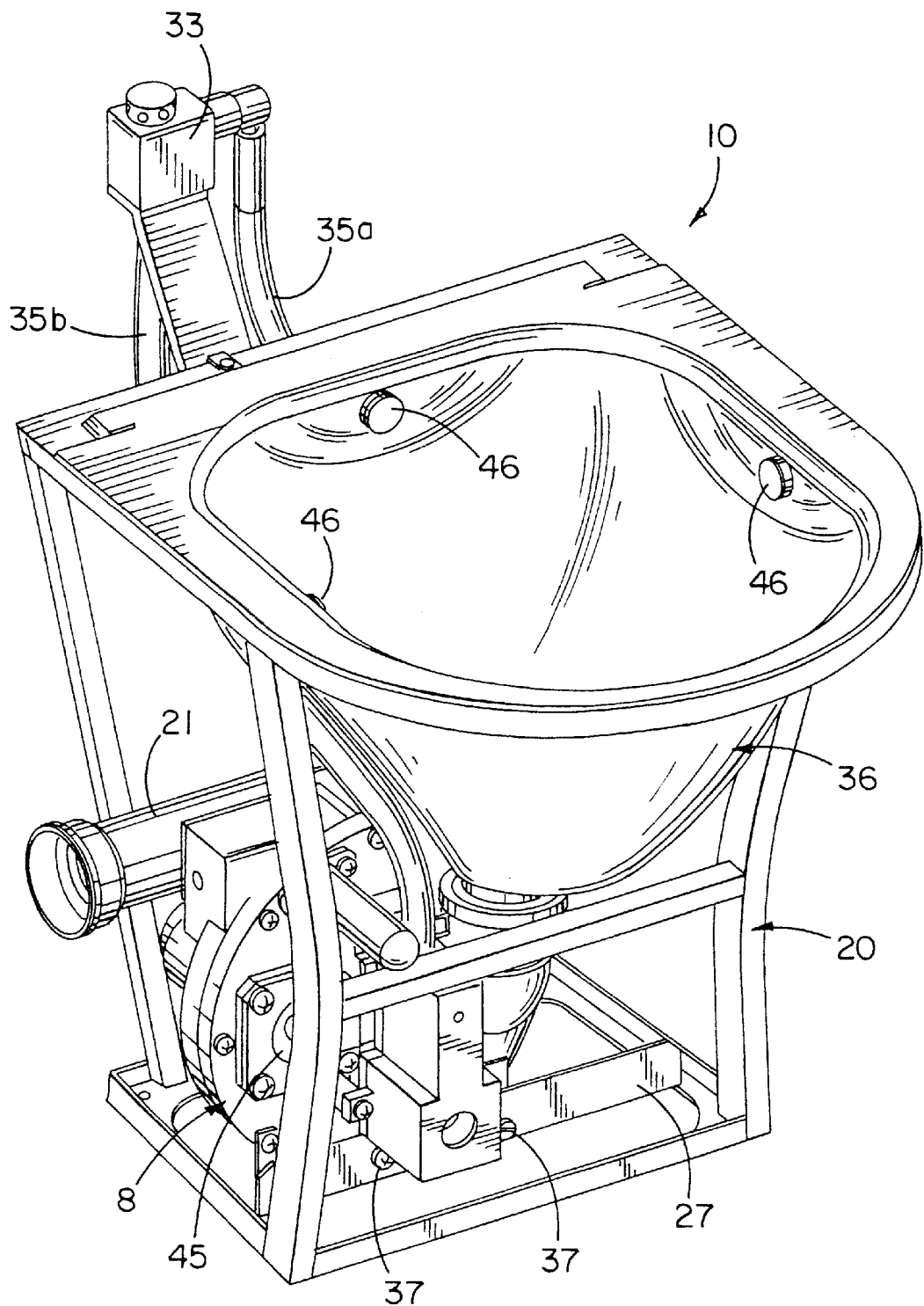
FIGS. 1A and 1B are perspective views of a vacuum toilet incorporating a discharge valve in accordance with the present invention.
Figure 1B:
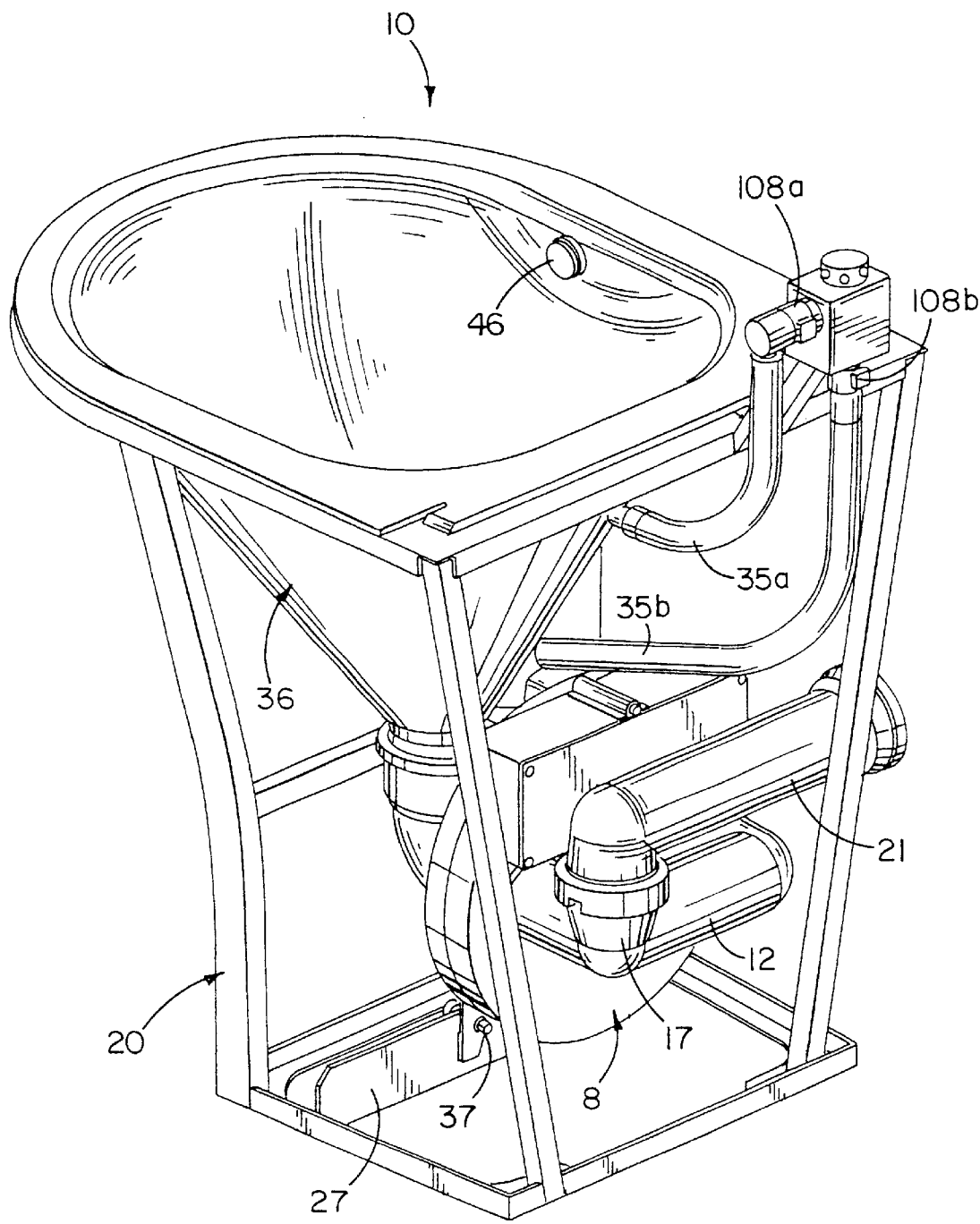
Figure 2:
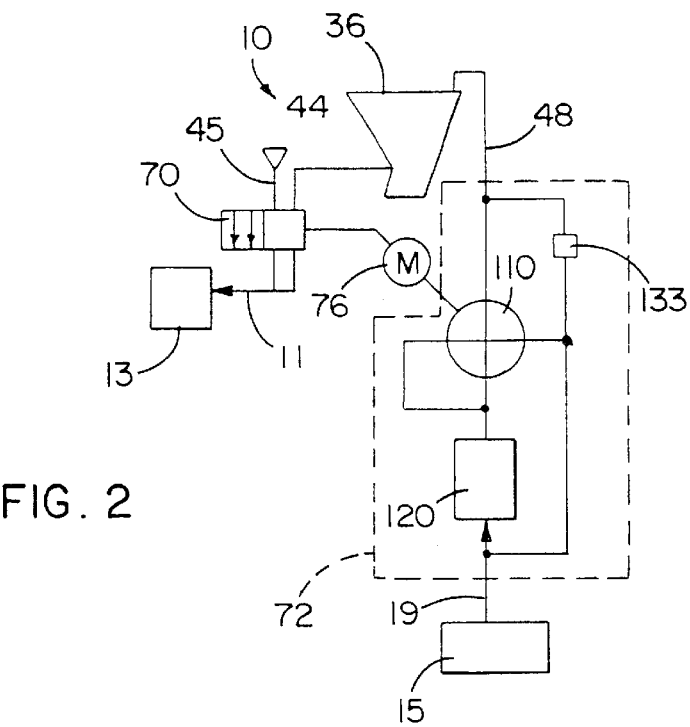
FIG. 2 is a schematic diagram of the vacuum toilet of FIG. 1.

A vacuum toilet 10 is illustrated in FIGS. 1A, 1B and 2 having a valve set 8 with a discharge valve 70 in accordance with the present invention. The vacuum toilet 10 includes a bowl 36 for receiving waste material connected to the valve set 8. In the preferred embodiment, the bowl 36 is supported by a frame 20 to form a replaceable bowl assembly, as described in greater detail in commonly owned and co-pending U.S. patent application Ser. No. 09/713,861, entitled "Toilet Bowl Assembly", incorporated herein by reference. The vehicle is provided with a sewer line 11, a vacuum tank 13 connected to the sewer line 11, and a vacuum source (not shown) for placing the vacuum tank 13 under partial vacuum pressure. The vehicle further includes a source of rinse fluid 15 connected to a rinse fluid supply line 19. At least one rinse fluid dispenser, such as nozzles 46, is provided inside the bowl 36 for directing rinse fluid over the surface of the bowl. A rinse fluid pipe 35 connects the valve set 8 to the nozzles 46.

Figure 3:
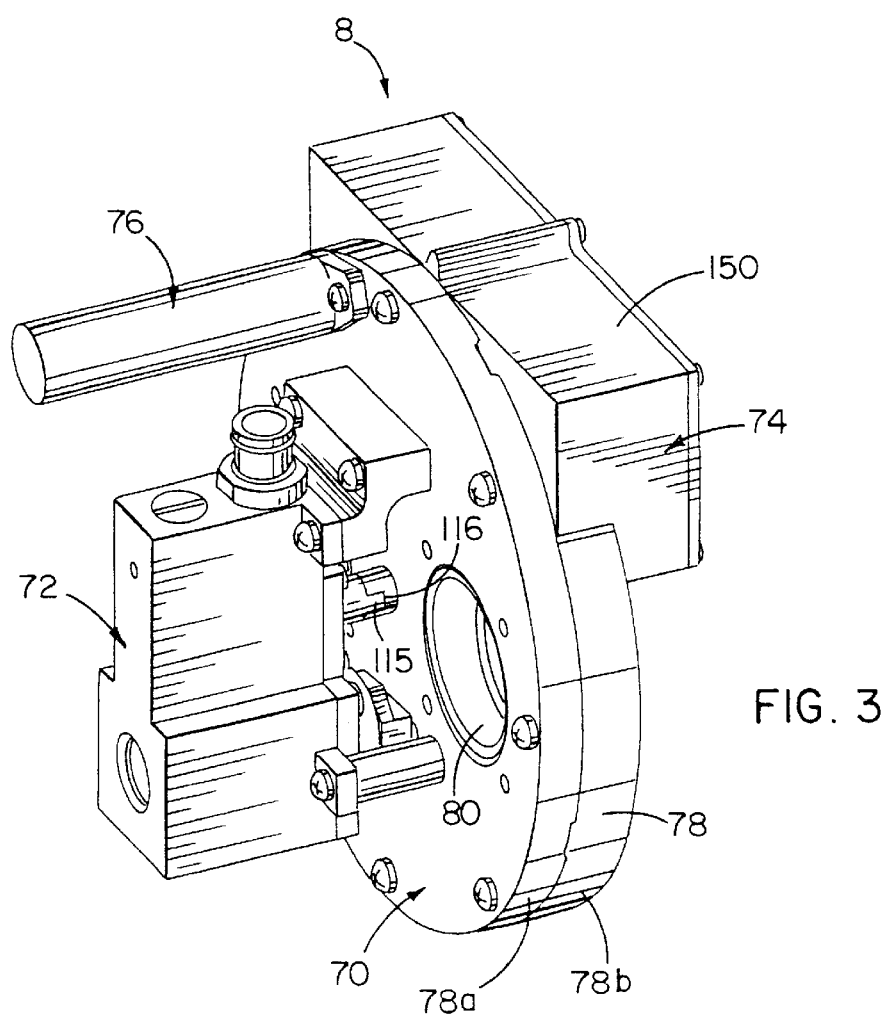
FIG. 3 is an enlarged perspective view of a valve set, including the discharge valve, incorporated into the vacuum toilet of FIG. 1.

As shown in FIG. 3, the valve set 8 comprises four sub-components: the discharge valve 70, a rinse valve 72, a flush control unit (FCU) 74, and an actuator 76. The preferred valve set is described in greater detail in commonly owned and co-pending U.S. patent application Ser. No. 09/713,870, entitled "Valve Set for a Vacuum Toilet", incorporated herein by reference. While the discharge valve 70 is described and illustrated herein as integrated into the valve set 8, it will be appreciated that the discharge valve 70 may be provided as a separate, independent component, without departing from the spirit and scope of the present invention.

Figure 4A:
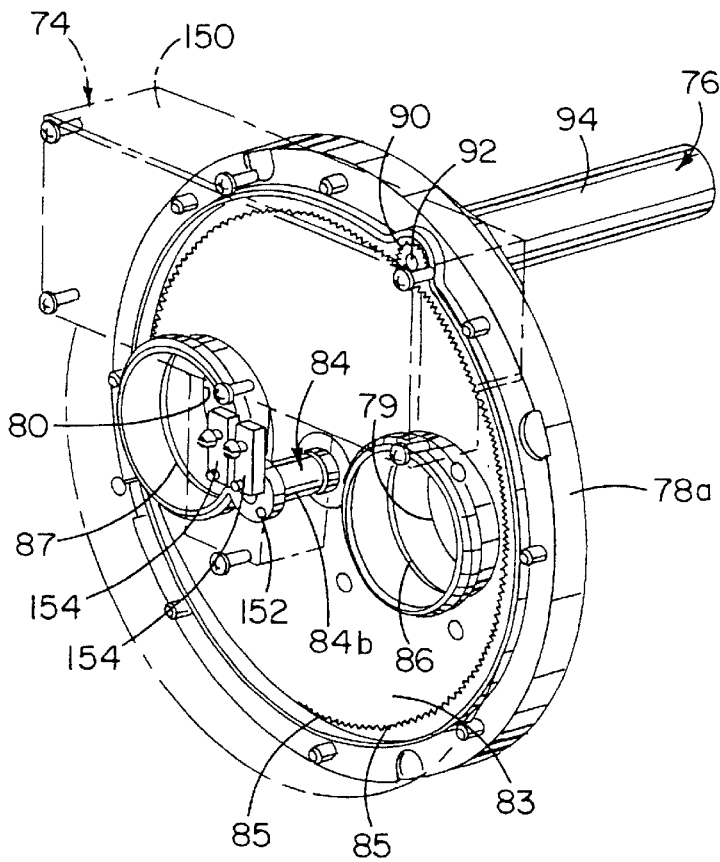
FIGS. 4A and 4B are perspective views of the discharge valve.
Figure 4B:
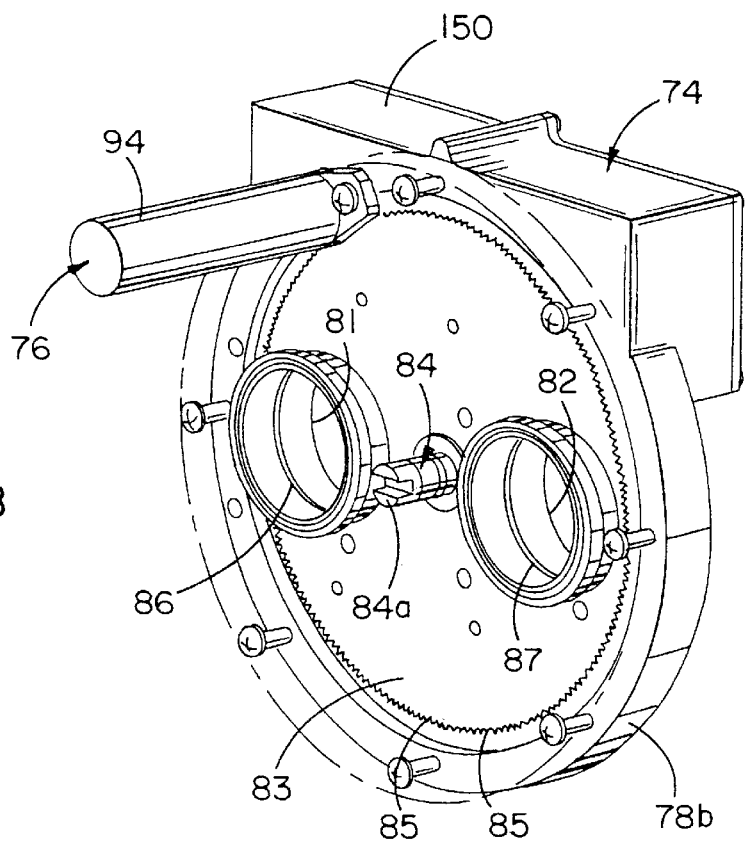

The discharge valve 70 includes a discharge valve housing 78 divided into two halves 78a, 78b. As best shown in FIGS. 4A and 4B, the housing 78 includes a pair of inlets 79, 80 formed in the housing half 78a aligned with a pair of outlets 81, 82 formed in the housing half 78b. The housing 78 further defines a chamber for receiving a discharge valve member, such as valve disk 83. An axle 84 is attached to the valve disk 80 and has two ends 84a, 84b. Holes are formed in the housing halves 78a, 78b sized to receive the axle ends 84a, 84b, respectively, so that the disk 83 is supported for rotation about the axle 84. In accordance with certain aspects of the present invention, the periphery of the disk 83 is formed with gear teeth 85, and a pair of apertures 86, 87 are formed through the disk 83. The apertures 86, 87 are spaced so that both register simultaneously with the associated inlet/outlet pairs 79/81, 80/82 as the disk 83 rotates. In the illustrated embodiment, the apertures 85, 86 and associated inlet/outlet pairs 79/81, 80/82 are spaced 180 degrees apart.

According to the illustrated embodiment, the inlet 79 is connected to one end of a transfer pipe 44, with the other end of the transfer pipe being attached to an outlet 42 of the bowl 36. In the preferred embodiment, the transfer pipe 44 includes a fitting 47 (FIG. 1A) adapted to frictionally and sealingly engage the bowl outlet 42, so that the transfer pipe 44 may be quickly and easily attached and removed from the bowl outlet 42. An air intake check valve 45 is attached to the other inlet 80, and is oriented to allow fluid to flow into the inlet 80 while preventing fluid from discharging out of the check valve 45. A U-shaped outlet pipe 12 (FIG. 1B) has a first end connected to the outlet 81 and a second end connected to the outlet 82. The outlet pipe 12 further has a branch 17 leading to a discharge pipe 21. In the preferred embodiment, the branch 17 includes a pair of spaced pins and the discharge pipe 21 includes a pair of J-shaped slots positioned to engage the pins, so that the discharge pipe 21 is removably attached to the branch 17. Furthermore, when the pins and J-shaped slots are spaced 180 degrees apart, the discharge pipe 21 may be positioned for either right- or left-handed discharge simply by rotating the discharge pipe 21 before attachment, without requiring changes to the other toilet components. The free end of the discharge pipe 21 is adapted for releasable connection to the sewer line 11, such as with a clam shell coupling (not shown).

In operation, when the disk apertures 86, 87 are aligned with the inlet/outlet pairs 79/81, 80/82, the discharge valve 70 not only transfers waste from the transfer pipe 44 to the sewer line 11, but also pulls additional air into the sewer line 11 through the air intake check valve 45. The additional air intake reduces noise that is normally generated during a flush.

The actuator 76 is provided for driving the valve disk 83. As best shown in FIG. 4A, the actuator 76 includes a spur gear 90 enmeshed with the gear teeth 85 formed about the periphery of the disk 83. The spur gear 90 is mounted to a rotatable shaft 92, and a drive is provided for rotating the shaft 92. The FCU 74 is operably coupled to the actuator 76 to control operation of the actuator. According to the illustrated embodiment, the disk 83 may be rotated in a single direction by ninety degree increments to open and close the discharge valve 70. Alternatively, the disk 83 may also be reciprocated back and forth across a ninety degree arc to open and close the valve 70, or the disk 83 may be controlled in other manners according to other disk designs and layouts.

Figure 5:
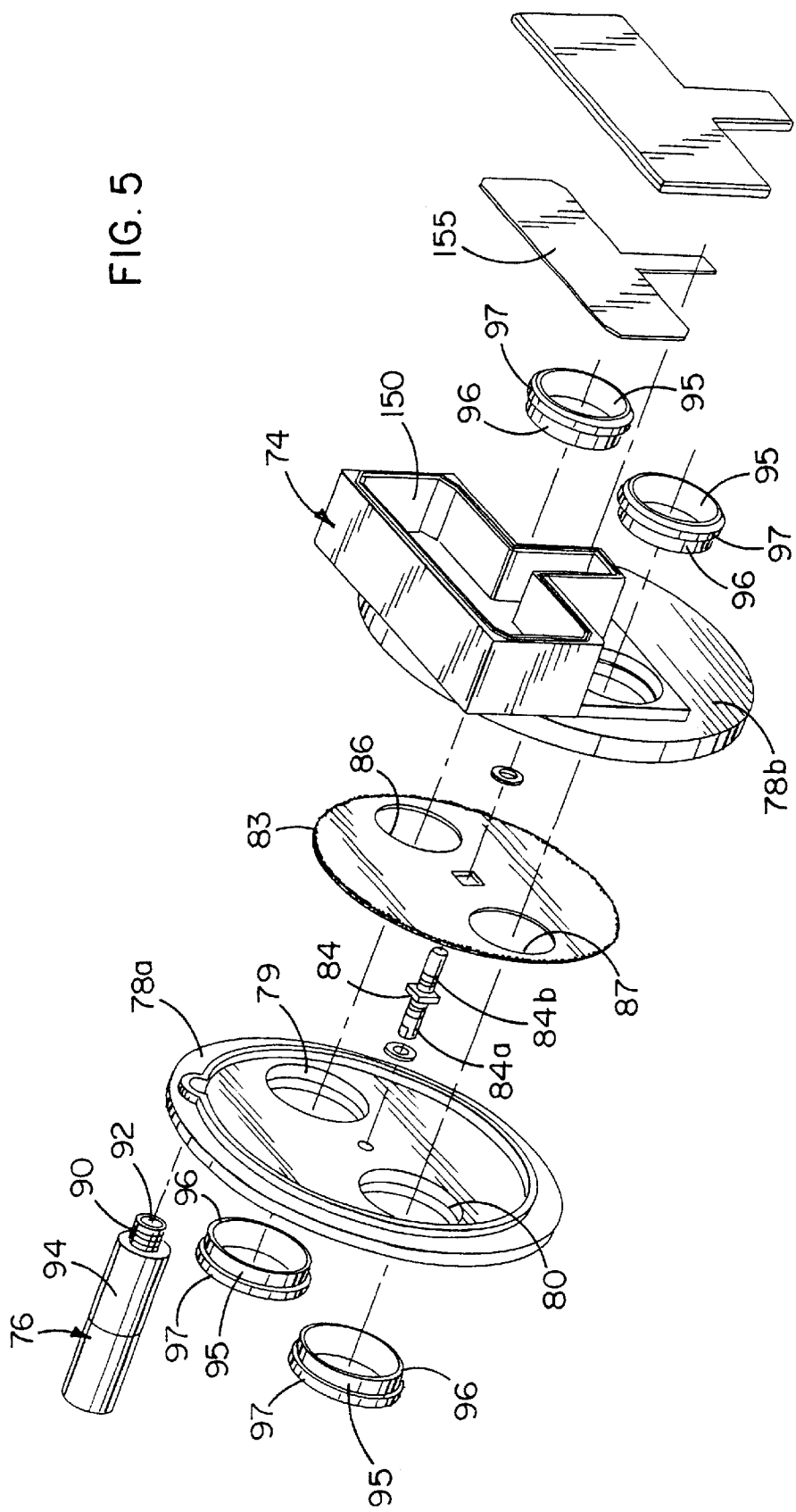
FIG. 5 is an exploded perspective view of the discharge valve.

In accordance with additional aspects of the invention, external seals are provided for preventing fluid leaks between the disk 83 and valve housing 78. As best shown in FIG. 5, four seals 95 are provided each having a cylindrical wall 96 sized for insertion into the inlets 79, 80 and outlet 81, 82. Each seal 95 further includes a lip 97 that engages an outside surface of the housing 78 to limit travel of the cylindrical wall 96 into the housing 78. The cylindrical walls 96 have a height sufficient to engage and seal with the disk 83 when fully inserted into the housing 78. The sealing engagement between the seals 95 and disk 83 is maintained during rotation of the disk 83 to prevent fluid leakage. The seals 95 may be inserted and removed from the outside of the housing 78, thereby obviating the need to disassemble the discharge valve housing 78 for a seal replacement. The seals 95 are preferably formed of ultra-high molecular weight polyethylene.

Figure 6:
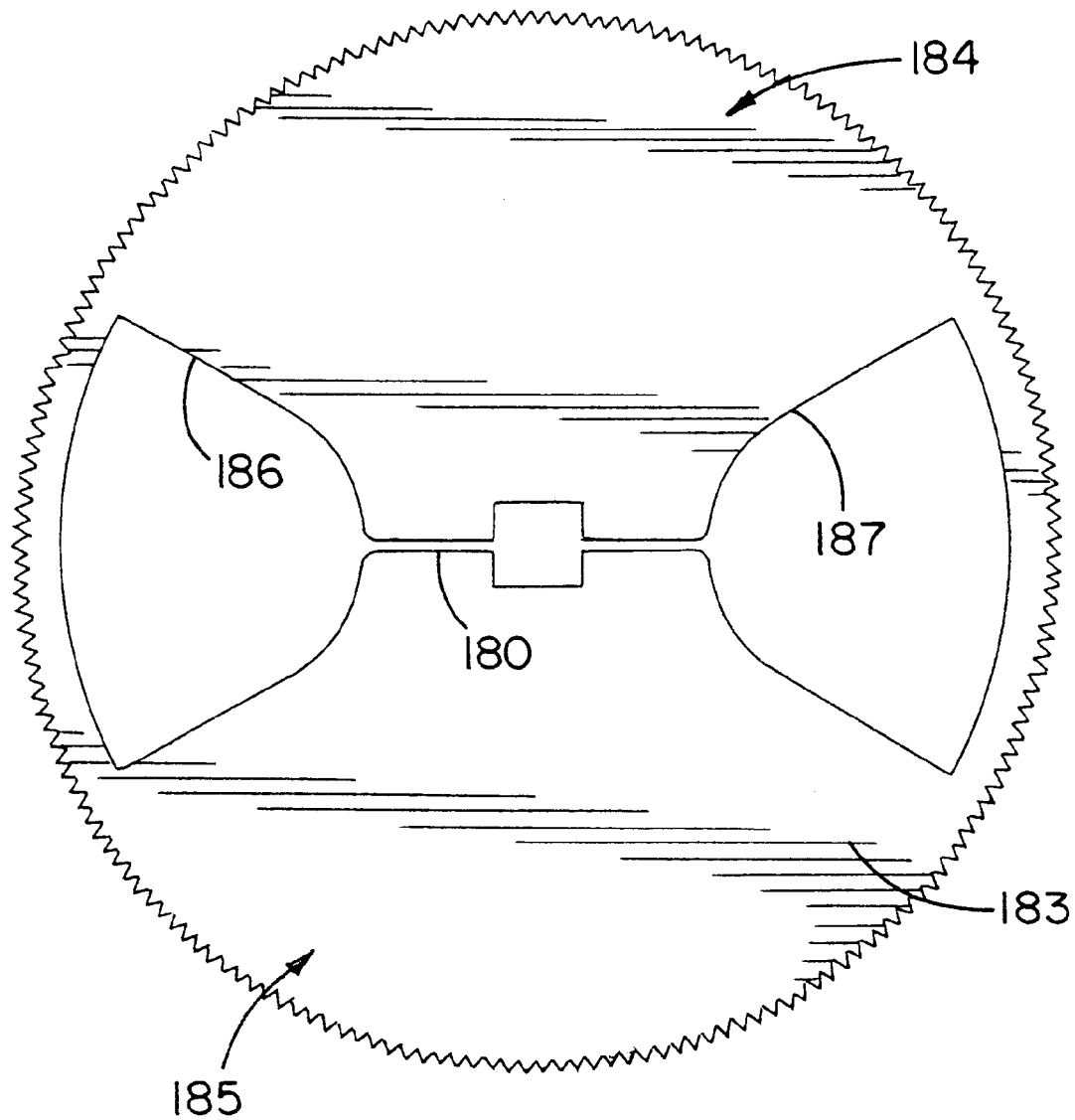
FIG. 6 is a side elevation view of an alternative discharge valve member embodiment.

Vacuum pressure present in the outlet pipe 12 will act on a closed disk 83 to pull the disk 83 toward the seals 95 inserted in the outlets 81, 82, thereby energizing the seals. Accordingly, it will be appreciated that the seals 95 inserted in the inlets 79, 80 do not technically seal with the disk 83, but instead help to center the disk 83 inside the housing 78. In an alternative disk embodiment illustrated at FIG. 6, a split disk 183 is provided to further enhance the seals formed at the outlets 81, 82. The disk 183 is formed with a pair of apertures 186, 187 connected by a slot 180. The slot 180 divides the disk 183 into two disk halves 184, 185 that are more easily flexed in a direction normal to the plane of the disk 183 (or into and out of the page as shown in FIG. 6). Because of the increased flexibility, the disk halves 184, 185 are more responsive to the vacuum pressure in the outlet pipe 12, so that the outlets 81, 82 are more reliably sealed.

The FCU 74 comprises a housing 150 attached to the discharge valve housing half 78b opposite the rinse valve 72 (FIG.3). The housing 150 encloses one or more circuit boards 155 (FIG. 5) for controlling operation of the discharge valve 70 via the actuator 76. Because the FCU 74 is located proximal to the actuator 76, the number of wires needed between the FCU 74 and actuator 76 is reduced.

In addition, the FCU housing 150 houses a position sensor for determining the position of the disk 83. As best shown in FIG. 4A, magnets 152 are attached to the axle end 84b of the disk 83. The axle end 84b extends into the FCU housing 150, so that the magnets 152 are positioned proximal the control board. Hall effect switches 154 are provided directly on the circuit board for sensing the magnets 152 and thus determining the rotational position of the disk 83. In the illustrated embodiment, a pair of magnets 152 are attached to the axle end 84b, and a pair of hall effect switches 154 are attached to the circuit board. The switches 154 actuate between on and off positions depending on the proximity of the magnets, thereby indicating the position of the disk 83. As a result, the position of the disk 83 is directly sensed rather than inferring disk position based on actuator position. In addition, the switches 154 are located inside the FCU housing 150 and are therefore isolated from contamination due to lubrication or other material.

From the foregoing, it will be appreciated that the discharge valve of the present invention has a simplified valve member drive due to the gear teeth formed about a periphery of the discharge valve member. In addition, the discharge valve simultaneously opens the drain and secondary air passages, and may be operated in a single direction. Furthermore, the seals are easily removed from an exterior of the valve, thereby facilitating replacement.

The foregoing detailed description has been given for clearness of understanding only, and no unnecessary limitations should be understood therefrom, as modifications would be obvious to those skilled in the art.

What is claimed is:

1. A discharge valve for use with a vacuum toilet system having a waste receptacle defining an outlet and a sewer line placeable under partial vacuum, the discharge valve comprising:

a housing, defining a flush valve inlet fluidly communicating with the waste receptacle outlet, a flush valve outlet fluidly communicating with the sewer line, an air intake valve inlet fluidly communicating with ambient air, and an air intake valve outlet fluidly communicating with the sewer line; and a rotatable valve member disposed in the housing and defining first and second apertures, the valve member having a closed position in which the valve member obstructs fluid communication between the flush inlet and flush outlet, and between the air intake valve inlet and air intake valve outlet, and an open position in which the first aperture establish fluid communication between the flush inlet and flush outlet, and the second aperture establish fluid communication between the air intake valve inlet and air intake valve outlet.

2. The discharge valve of claim 1, in which the valve member comprises a disk.

3. The discharge valve of claim 1, in which the movable valve member is supported for rotation inside the housing, and the apertures are spaced substantially 180 degrees apart with respect to a rotation axis of the valve member.

4. The discharge valve of claim 3, in which the valve member is rotated in a single direction between open and closed positions.

5. The discharge valve of claim 3, in which the valve member is rotated in ninety degree increments between open and closed positions.

6. The discharge valve of claim 3, in which the valve member is reciprocated in two directions between open and closed positions.

7. The discharge valve of claim 1, further comprises
a first seal having a cylindrical wall sized for insertion from an exterior of the housing into the flush valve inlet, the cylindrical wall having a bottom edge adapted to engage and seal with the rotatable valve member.

8. The discharge valve of claim 7, further comprising a second seal having a cylindrical wall sized for insertion from an exterior of the housing into the flush valve outlet, the cylindrical wall having a bottom edge adapted to engage and seal with the rotatable valve member.

9. The discharge valve of claim 7, in which the first seal comprises ultra-high molecular weight polyethylene.

10. The discharge valve of claim 8, further comprises a first air intake seal having a having a cylindrical wall sized for insertion from an exterior of the housing into the air intake valve inlet, the cylindrical wall having a bottom edge adapted to engage and seal with the rotatable valve member.

11. The discharge valve of claim 10, further comprising a second air intake seal having, a cylindrical wall sized for insertion from an exterior of the housing into the air intake valve outlet, the cylindrical wall having a bottom edge adapted to engage and seal with the rotatable valve member.

12. A discharge valve for use in a vacuum toilet system having a waste receptacle defining an outlet and a sewer line placeable under partial vacuum, the discharge valve comprising:
a housing defining a discharge valve inlet fluidly communicating with the waste receptacle outlet and a discharge valve outlet fluidly communicating with the sewer line
a rotatable valve member disposed in the housing and defining first and second apertures, the valve member having a closed position in which the valve member obstructs fluid communication between the discharge valve inlet and outlet, and between an air intake valve inlet which communicates with ambient air and an air intake valve outlet which communicates the sewer line, and an open position in which the first aperture establish fluid communication between the discharge valve inlet and outlet and the second aperture establish fluid communication between the air intake valve inlet and outlet; and
a sensor for detecting position of the valve member, the sensor being located outside of the housing.

13. The discharge valve of claim 12, in which at least one magnet is attached to the valve member, and the position sensor comprises a hall effect sensor positioned to detect the position of the magnet.

14. The discharge valve of claim 13, in which the valve member comprises a disk supported for rotation about an axle.

15. The discharge valve of claim 14, in which the at least one magnet is attached to an end of the axle.

16. The discharge valve of claim 15, in which axle end extends into a flush control unit, and in which the ball effect sensor is housed in the flush control unit.

17. The discharge valve of claim 16, in which the hall effect sensor is provided directly on a circuit board.

18. A discharge valve for use in a vacuum toilet system having a bowl defining an outlet and a sewer line placeable under partial vacuum, the discharge valve comprising;
a housing defining a discharge valve inlet adapted for fluid communication with the bowl outlet and a discharge valve outlet adapted for fluid communication with the sewer line;
a seal disposed inside the discharge valve outlet;
a disk disposed inside the housing having first and second apertures connected by a slot, the first aperture, second aperture, and slot dividing the disk into first and second disk halves, the disk being rotatable between a closed position, in which one of the first and second disk halves engages the seal to obstruct fluid flow, and an open position, in which one of the first and second apertures is aligned with the seal to allow fluid flow therethrough;
wherein the slot allows the first and second disk halves to deflect in response to partial vacuum at the discharge valve outlet to more reliably engage the disk with the seal in the closed position.

19. The discharge valve of claim 18, in which the housing further defines an air intake inlet and an air intake outlet, and in which a second seal is disposed inside the air intake outlet, wherein one of the first and second disk halves also engages the second seal when the disk is in the closed position, and wherein the other of the first and second apertures is also aligned with the second seal when the disk is in the open position.

20. The discharge valve of claim 19, in which a periphery of the disk is formed with a series of gear teeth.

21. An integrated valve set for use in a vacuum toilet system having a waste receptacle defining an outlet and a sewer line placeable under partial vacuum, the integrated valve set comprising:
a discharge valve having a housing with an inlet in fluid communication with the waste receptacle outlet and an outlet in fluid communication with the sewer line, and a rotatable valve member disposed in the housing and defining first and second apertures, the valve member having a closed position in which the valve member obstructs fluid communication between the inlet and outlet, and between an air intake valve inlet which communicates with ambient air and an air intake valve outlet which communicates the sewer line, and an open position in which the first aperture establish fluid communication between the valve housing inlet and outlet and the second aperture establish fluid communication between the air intake valve inlet and outlet; and a flush control unit operably to the discharge valve and having a housing attached to the discharge valve housing, the flush control unit including a position sensor for detecting the position of the discharge valve member.

22. The integrated valve set of claim 21, in which a magnet is attached to the discharge valve member, and in which the position sensor comprises a hall effect switch responsive to a position of the magnet.

23. The integrated valve set of claim 21, in which the rotatable discharge valve member comprises a disk having an axle with an end disposed inside the flush control unit housing, and in which the position sensor detects a rotational orientation of the axle.

24. The integrated valve set of claim 23, in which a magnet is attached to the axle end, and in which the position sensor comprises a hall effect switch responsive to a position of the magnet.

25. The integrated valve set of claim 21, further comprising an actuator adapted to engage and move the discharge valve member.

26. The integrated valve set of claim 21, in which the toilet system further comprises a source of rinse fluid and the waste receptacle has a rinse fluid dispenser associated therewith, and in which the integrated valve set further comprises a rinse fluid valve having an inlet in fluid communication with the rinse fluid source, an outlet in fluid communication with the rinse fluid dispenser, and a rinse fluid valve member.

27. The integrated valve set of claim 26, in which the rinse fluid valve member is mechanically coupled to the discharge valve member.

* * * * *